Jan. 25, 1927.  1,615,535
G. CLAUDE
SYNTHESIS OF AMMONIA BY HYPER PRESSURES
Filed Nov. 19, 1921
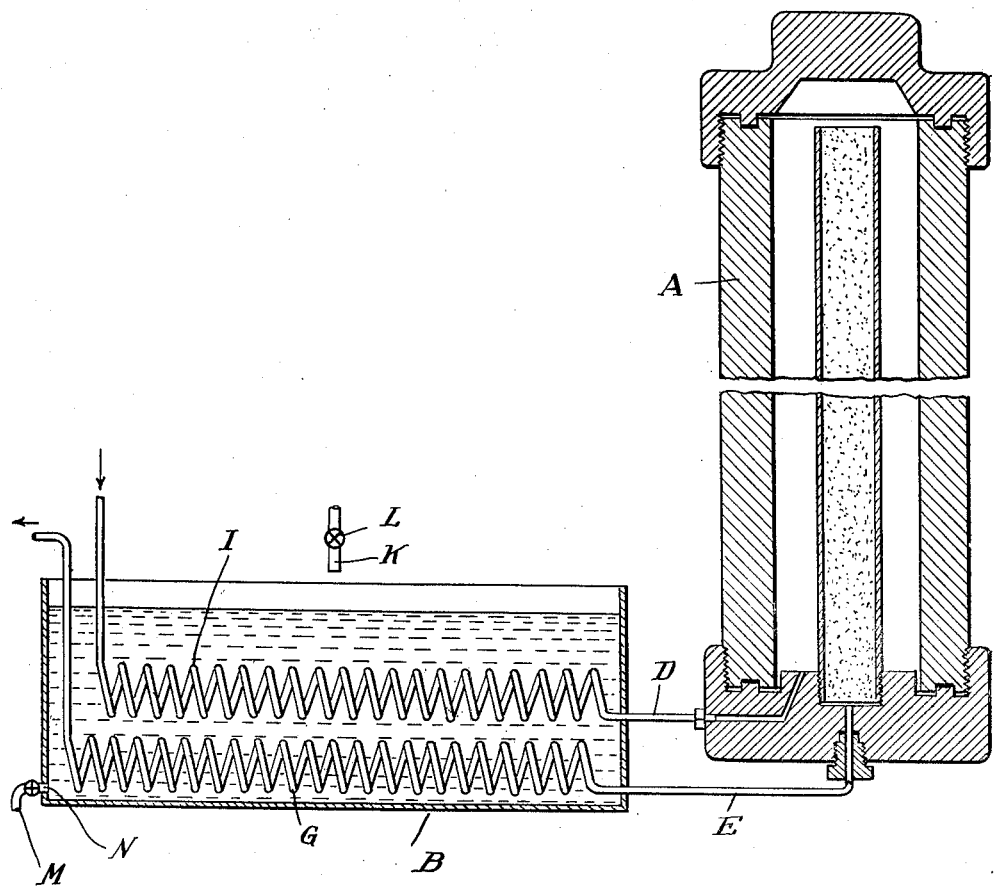
INVENTOR.
Georges Claude
BY
ATTORNEYS.

Patented Jan. 25, 1927.

1,615,535

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

SYNTHESIS OF AMMONIA BY HYPERPRESSURES.

Application filed November 19, 1921, Serial No. 516,505, and in France November 20, 1920.

The present invention relates to improvements in the processes for the direct synthesis of ammonia in which, according to my copending application N° 451,765, filed March 12, 1921, and application N° 516,045, filed November 18, 1921, the gases to react are heated by indirect contact with the catalyzing substance with interposition of a wall possessing a heat conductivity such that these gases arrive on the catalyzing material under normal working at a temperature preferably the lowest which permits the normal maintenance of the reaction. While the invention is described with reference more particularly to the synthesis of ammonia, it can be applied with equal advantage in conducting other syntheses in which the same conditions with respect to the heat balance are present.

Now while carrying those processes into practice it is necessary for the above condition to be fulfilled that the hyperpressure employed has a suitable value; with the usual catalyzing agents that "suitable" good pressure is of the order of 1000 atmospheres.

For pressures under that "suitable" pressures, for instance for pressures of 700 atmospheres, with the usual catalyzing substances the quantity of heat evolved by the reaction and transmitted by the wall with preferably variable heat conductivity according to my copending application N° 516,045 filed November 18, 1921, is not sufficient to heat these gases to the desired temperature necessary for the reaction; it is therefore necessary to heat them to the amount desired for the purpose of maintaining the reaction. As is obvious there may be used for this purpose one or more of the electric circuits serving for the initial heating which may be kept closed permanently but this means would prove expensive.

The means employed according to the present invention consist in slightly heating the gases prior to their admission to the apparatus, so as to compensate for the deficit in heat, preferably by causing the gases to pass through a coil immersed in a water-bath also traversed by the gases passing out from the apparatus and circulating in a second coil.

By causing the velocity of the current of water to vary, there will be obtained a preliminary heating of the entering gases to a temperature between the temperature of the surrounding atmosphere and 100° C. If such heating be insufficient recourse may be had to a liquid or to a solution boiling above 100° C., or even to water boiling under pressure and this admission temperature is regulated according to the content of the escaping gases or to the rapidity with which the liquid ammonia is produced.

To more clearly illustrate the application of the invention, the accompanying drawing indicates in diagram an apparatus adapted to be used in connection therewith.

Referring to the drawing, A represents the catalyzing chamber to which the gaseous mixture is supplied through a tube D which may be coiled as at I and immersed in liquid contained in the tank B. The gaseous mixture after reaction escapes from the chamber through a pipe E which is similarly coiled at G and immersed in the liquid of the tank B. Obviously the incoming gas passing through the coil I will be subjected to the heating effect of the liquid which is in turn heated by the outgoing gaseous mixture in the coil G. Water may be supplied through an inlet K controlled by a valve L and withdrawn through an outlet M controlled by a valve N, the stream of water being thus readily controlled.

Various changes may be made in the details of the method and particularly in the character of the apparatus employed without departing from the invention or sacrificing any of the advantages thereof.

I claim:

1. The method of carrying out the direct synthesis of ammonia, which comprises heating the compressed gases to react to the temperature suitable for the reaction first by cooling the hot gases which have left the catalyzing substance in regulated heat exchange relation with the compressed gases and then by circulating the compressed gases in heat exchange relation with the gases under reaction.

2. The method of carrying out the direct synthesis of ammonia, which comprises heating the compressed gases to react to the temperature suitable for the reaction, first by circulating in heat exchange relation with a fluid, the temperature of which is controllable and which is itself in heat exchange relation with the hot gases which have left the catalyzing substance and become thus partly cooled, then by circulating the partly warmed gases to react in heat exchange relation with the gases under reaction.

3. The method of carrying out the direct synthesis of ammonia, which comprises heating the gases to react to the temperature suitable for the reaction by heat-interchange with the catalyzing substance and with the hot gases after leaving the catalyzing substance, and regulating the temperature of the entering gases by varying the rate of heat-transfer from the hot gases.

4. The method of carrying out the direct synthesis of ammonia in the presence of a catalyzing material and under the combined effect of high temperature and pressure, which comprises conveying the gaseous mixture prior to the reaction in indirect contact with the reacting gases in the catalyzing chamber so that the gaseous mixture is delivered to the catalyzing material at the lowest temperature commensurate with the normal maintenance of the reaction, and supplying additional heat necessary for the attainment of the desired temperature by regulated heat interchange between the gaseous mixture after reaction and the entering gaseous mixture before its indirect contact with the catalyzing material.

5. The method of carrying out the direct synthesis of ammonia in the presence of a catalyzing material and under the combined effect of high temperature and pressure, which comprises conveying the gaseous mixture prior to the reaction in indirect contact with the reacting gases in the catalyzing chamber so that the gaseous mixture is delivered to the catalyzing material at the lowest temperature commensurate with the normal maintenance of the reaction, supplying additional heat necessary for the attainment of the desired temperature by heat interchange between the gaseous mixture after reaction and the entering gaseous mixture before its indirect contact with the catalyzing material and regulating, the heat interchange by varying the flow of a liquid-exchange medium.

6. The method of carrying out the direct synthesis of ammonia in the presence of a catalyzing material and under the combined effect of high temperature and pressure, which comprises conveying the gaseous mixture prior to the reaction in indirect contact with the reacting gases in the catalyzing chamber so that the gaseous mixture is delivered to the catalyzing material at the lowest temperature commensurate with the normal maintenance of the reaction, supplying additional heat necessary for the attainment of the desired temperature by heat interchange between the gaseous mixture after reaction and the entering gaseous mixture before its indirect contact with the catalyzing material and regulating, the heat interchange by varying the flow of water as an exchange medium.

7. The method of conducting exothermic catalytic gaseous reactions, which comprises heating the compressed gases to react to a temperature suitable for the reaction, first by circulating them in heat exchange relation with a fluid, the temperature of which is controllable and which is itself in heat exchange relation with the hot gases which have left the catalyzing substance and have become thus partly cooled, and then by circulating the partly warmed gases to react in heat exchange relation with the gases undergoing reaction.

8. The method of conducting exothermic gaseous reactions in the presence of a catalyzing material and under the combined effect of high temperature and pressure, which comprises conveying the gaseous mixture prior to the reaction in heat exchange relation with the reacting gases in the catalyzing chamber so that the gaseous mixture is delivered to the catalyzing material at the lowest temperature commensurate with the normal maintenance of the reaction, supplying additional heat necssary for the attainment of the desired temperature by heat interchange between the gaseous mixture after reaction and the entering gaseous mixture before it is in direct contact with the catalyzing material, and regulating the heat interchange by varying the flow of water as an exchange medium.

In testimony whereof I, GEORGES CLAUDE have signed this specification.

GEORGES CLAUDE.